Aug. 24, 1943.    D. S. BARROWS ET AL    2,327,954
SIDE BEARING
Filed Sept. 7, 1939    3 Sheets-Sheet 1
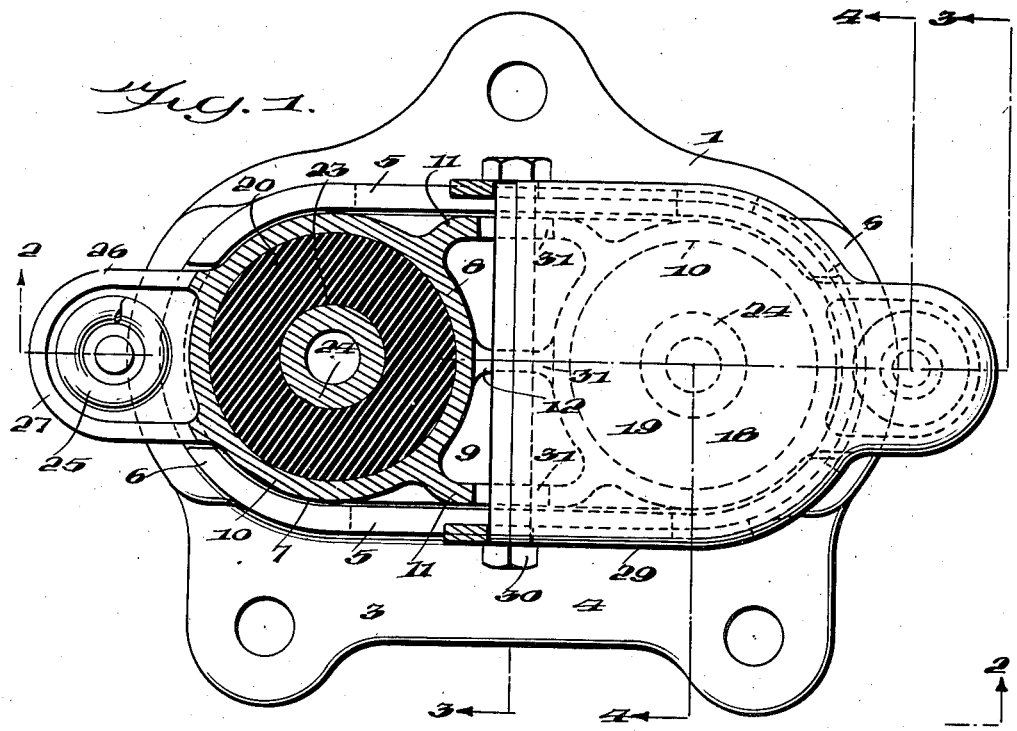
Fig. 1.
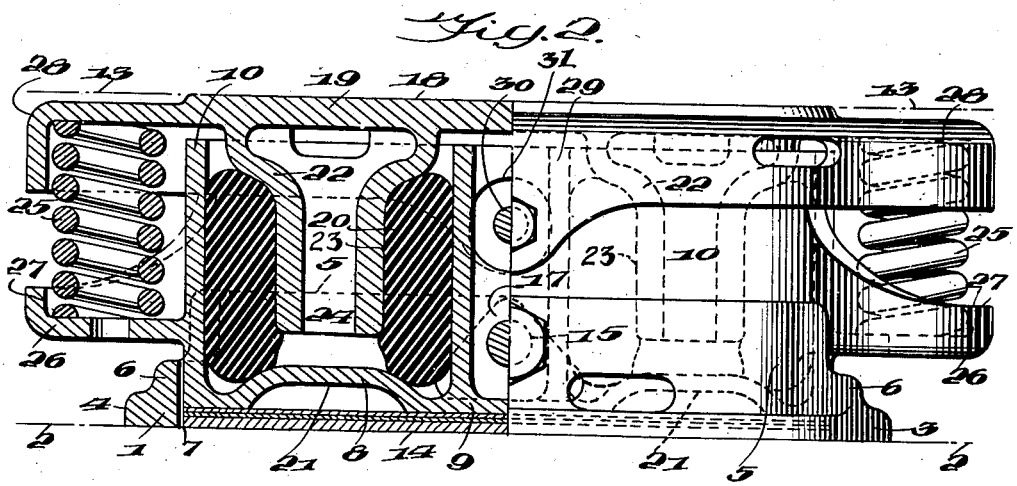
Fig. 2.
Inventors
Donald S. Barrows
Emil H. Blattner,
By 
their Attorney

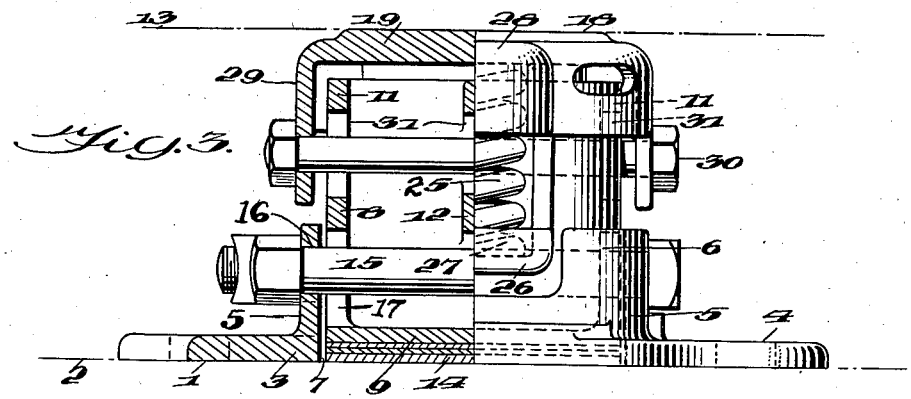
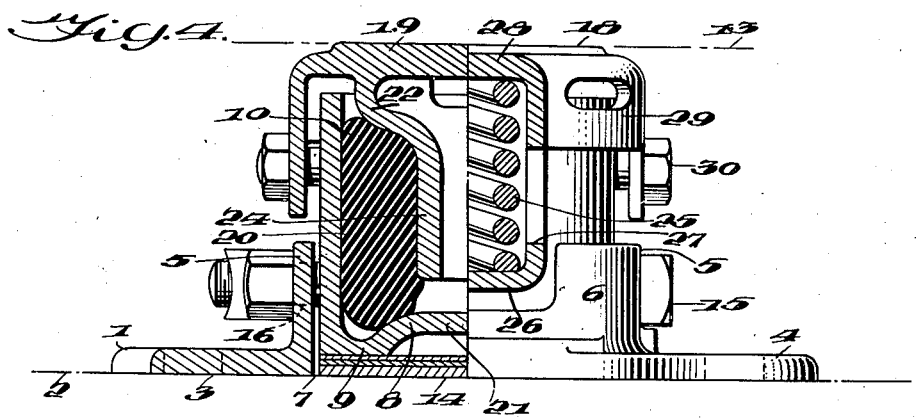
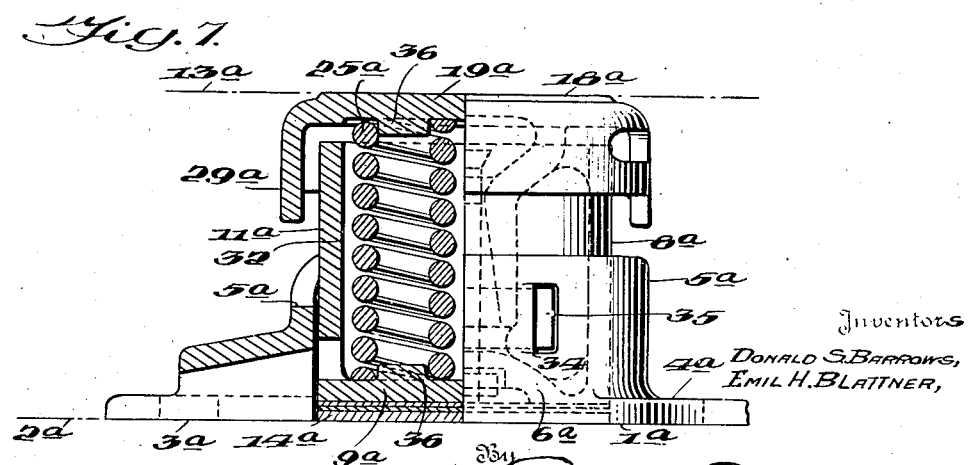

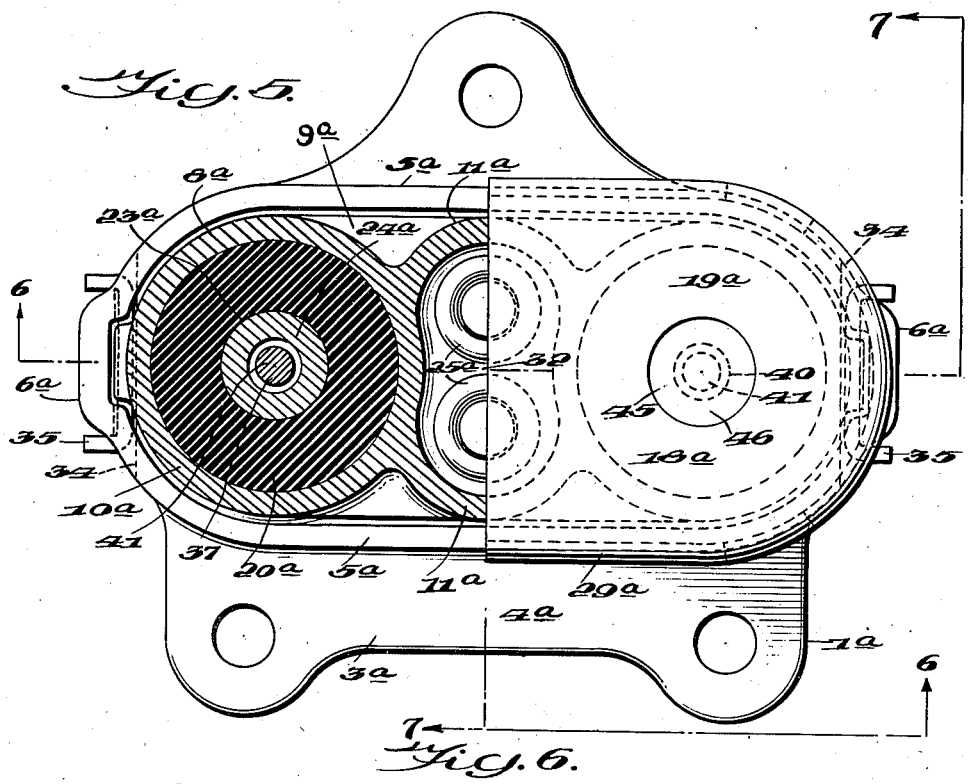

Patented Aug. 24, 1943

2,327,954

UNITED STATES PATENT OFFICE 2,327,954

SIDE BEARING

Donald S. Barrows and Emil H. Blattner, Rochester, N. Y., assignors to The Symington-Gould Corporation, Rochester, N. Y., a corporation of Maryland Application September 7, 1939, Serial No. 293,843

15 Claims. (Cl. 308—138)

The invention relates to a side bearing for use with railway vehicles and more particularly to a resilient type thereof.

An object of the present invention is to provide a side bearing capable of cushioning or snubbing the rock or roll of a railway car body.

Another object of the invention is the provision of resilient means of different character in a side bearing to resist the compressive movement thereof as well as return a compressed side bearing to expanded or normal position.

A further object of the invention is the provision of resilient means in a side bearing to resiliently resist a downward and horizontal movement of a portion of the side bearing.

A still further object of the invention is to provide a vertically adjustable side bearing which is adapted to be interposed between spaced members of a railway vehicle.

An additional object of the invention is to provide, in a side bearing unit, a resilient means interposed between two relatively movable members thereof and resilient means of different character acting between the movable members to ensure a completely expansive movement of a compressed side bearing as well as prevent harmonic action of the resilient means of the unit.

The above and other objects will become apparent from the succeeding description of an exemplified form of the invention which is illustrated in the accompanying drawings and wherein:

Figure 1 is a horizontal view of a side bearing embodying a form of the invention, a portion thereof being shown in section and the remaining portion thereof being shown in plan.

Figure 2 shows a partial vertical sectional view and a partial side elevational view of the side bearing taken along the lines 2—2 of Figure 1, looking in the direction of the arrows.

Figure 3 shows a partial vertical sectional view and a partial end elevational view of the side bearing taken along the lines 3—3 of Figure 1, looking in the direction of the arrows.

Figure 4 shows a vertical cross sectional view taken along the lines 4—4 of Figure 1, looking in the direction of the arrows.

Figure 5 is a partial horizontal sectional view and a partial plan view of a modification of the side bearing illustrated by Figures 1 to 4, inclusive.

Figure 6 is a partial vertical sectional view and a partial side elevational view of the side bearing of Figure 5 taken along the lines 6—6 thereof, looking in the direction of the arrows.

Figure 7 is a partial vertical cross sectional view and a partial end of the modified side bearing taken along the lines 7—7 of Figure 5, looking in the direction of the arrows.

Referring now in detail to the drawings, wherein like reference characters designate like parts, and first considering the embodiment of the invention illustrated in Figures 1 to 4, inclusive, the numeral 1 generally indicates a side bearing of the above referred to resilient type adapted to be supported by a bolster or load carrying member of a railway vehicle truck, only a top surface 2 of which is shown. The side bearing comprises a sleeve or retaining means 3 having a base plate 4 bearing upon the truck bolster and being suitably apertured to accommodate rivets or any desired type of means for securing the sleeve to the bolster and thereby retain it in a predetermined position. Upstanding from the base plate are centrally disposed, laterally spaced, longitudinally extending side walls 5 joined by or merging into arcuate or cylindrically formed end walls 6 to present an upwardly opening relatively shallow receptacle 7.

Occupying the receptacle and prevented from shifting in any horizontal direction relatively to the sleeve by means of the side and end walls thereof is a housing or casing 8 comprising a bottom or lower plate member 9 having upstanding therefrom in longitudinally spaced relation a pair, or a plurality, of upwardly opening, cup-shaped, tubular or cylindrical members 10. Transversely spaced side ribs 11 and a central rib 12 extend between and integrally join the cylindrical members to rigidify the housing against stresses to which it will be subjected during service. Since the side bearing engaging surface of the body bolster, indicated by the diagrammatic line 13, may, due to manufacturing tolerances in the respective bolsters, vary in height from the opposed truck bolster surface 2, and the present side bearing is arranged and constructed to be, at all times, against or to be in constant contact with the body bolster surface 13, the side bearing is desirably made adjustable vertically in order to be capable of being interposed between opposing bolster surfaces and perform the function for which it is designed. For the accomplishment of this purpose there is provided a plurality of shims or plates 14, the exact number and thickness of which is to be determined upon an application of a side bearing to a railway vehicle. The shims are in subjacent relation to the housing bottom plate 9 to maintain the housing and its associated structure in a predetermined elevation and positioned within the sleeve receptacle 7 to thereby prevent their accidental or unwarranted displacement.

From a study of the side bearing under immediate consideration and as will be apparent from the succeeding description, it will be noted that, if desired, no means is required to be associated with the housing and sleeve to maintain them in assembled relation during service. However, as a precautionary measure as well as giving due consideration to the shipment of the side bearing as an individual unit from the source of manufacture to the location of application, a bolt 15 or any such means extends through aligned apertures 16 in the sleeve side walls and apertures 17 in the housing side ribs to lock the sleeve and housing together. The apertures 17 are of a dimension sufficient to permit a vertical adjustable movement of the housing upon the removal or application of wear plates to suit the particular distance between the confronting bolster surfaces.

Forming a body bolster engaging member and a component part of the side bearing is a relatively movable cap or cover 18 having a top or bearing plate 19 adapted to be in constant contact with the surface 13 of the overlying body bolster. The bearing plate is spaced a desired distance above the housing, and this distance is determinative of the permissible compressive movement of the side bearing. As will be noted from a study of Figures 2 and 3, the bearing plate is of an extent which is greater than the immediate underlying portion of the housing, and upon a compressive movement of the side bearing or a downward movement of the cover the cap will be brought to bear upon the housing. If the side bearing is subjected to forces in excess to its compressive capacity the side bearing, after it has been completely compressed, will then function as a solid or non-resilient unit to positively prevent a further approach of the confronting bolster surfaces 2 and 13, thereby limiting the rock or roll of the car body.

Positioned within each housing cylinder is a resilient member 20 preferably formed of a deformable material, such as rubber, and being capable of cushioning the compressive forces to which the side bearing will be subjected in service. In order to form pockets into which the rubber may flow upon compression thereof, the lower plate of the housing is provided with inverted dish portions or inwardly directed convolutions 21 disposed centrally of the cylinders, and the cap bearing plate has a plurality of downwardly directed, integrally formed, circular abutments or shoulders 22 disposed oppositely from the convolutions. The rubber members are prevented from expanding radially by means of the housing cylinders and are in intimate contact with or interposed between the convolutions and shoulders to resiliently resist a downward movement of the side bearing cap.

The resilient members are preferably cylindrical or tubular in form and each contains an axial bore 23 into which extends an arm, prong, depending member or integral means 24 merging into or forming a continuation of an associated cap shoulder. The prongs are desirable in intimate contact with the resilient members to form cap centralizing elements, and by reason of this arrangement any horizontal movement, either in a transverse or longitudinal direction, of the cap with respect to the housing will be resiliently resisted. It will be noted that upon any deviation of the cap from the illustrated normal position due to lateral or longitudinal thrusts transmitted thereto during service, no contacts will result between the cap and housing to build up a false capacity of the side bearing.

Means has been provided to assist the rubber members in resisting the compressive movement of the side bearing as well as assist them to return a compressed unit to an expanded position. Consideration has also been given to the prevention of a synchronous or harmonic action being set up in the resilient elements of the side bearing since an unsnubbed roll of a car body may result in the creation of excessive stresses in the entire vehicle. With the above thoughts foremost, resilient elements of different character from the rubber members are interposed between the side bearing housing and cap. As illustrative, but by no means intended as a limitation, a coil or helical spring 25 is positioned outwardly of an associated housing cylinder to have a lower extremity thereof bear upon a ledge or shelf 26 outstanding from and formed integrally with each cylinder. Each shelf has a vertical or peripheral spring retaining flange 27 which, where it merges with the cylinder, extends upwardly to form gussets for reinforcing the shelf structure. Since the shelves are positioned adjacent the lower extremity of the housing in order to accommodate a coil spring of given capacity, portions of the sleeve end walls are relieved or decreased in height to accommodate the shelves. The cap bearing plate is extended, as at 28, longitudinally of the side bearing to form top seats against which the upper extremities of the coil springs bear.

To complete the side bearing cap, the bearing plate and extensions thereof are provided with a depending peripheral flange 29 which, for the extent of the bearing plate proper, forms a protective means or shield preventing the entrance of any foreign substance to within the side bearing and, for the length of the extensions, forms a means whereby the upper extremities of the coil springs are retained in operable position.

Removed from an assembled side bearing, the rubber members are preferably of an outside diameter which is less than the corresponding dimensions of the occupied cylinders, and the bores 23 are of dimensions greater than the diameter of the prong. This, therefore, facilitates an assembly of the elements, and upon a downward movement of the cap to the position as illustrated, the rubber cylinders will be initially compressed to present a side bearing of desired capacity.

Means has been provided to maintain the cap and housing in assembled relation as well as limit the expansive movement of the side bearing from the normal or illustrated position, and, as an exemplification of this construction, a transversely extending bolt 30, of commercial form, projects through the side bearing and is carried by the cap flange. The bolt 30, spaced vertically from the bolt 15, extends through substantially enlarged aligned apertures 31 in the housing side and central ribs whereby a free unrestricted side bearing compressive movement of the cap is permitted while the bolt is adapted to engage or capable of engaging the housing ribs to limit an upward or side bearing expansive movement of the cap.

Referring now to the embodiment of the invention illustrated by Figures 5 to 7, inclusive, the side bearing, generally designated as 1ª, is also of the resilient type and capable of cushioning or snubbing the roll or rock of a vehicle car box. The side bearing, positioned adjacent an extremity of a load carrying member or truck bolster, only a top surface 2ª of which is illustrated, comprises a sleeve or retaining means 3ª having a base plate 4ª bearing upon the underlying bolster and being suitably apertured for the accommodation of holding means of any desired nature for retaining the sleeve in a predetermined position. Projecting upwardly from the base plate, substantially centrally thereof, are transversely spaced, longitudinally extending, side walls 5ª terminating in or merging into longitudinally spaced, cylindrically formed end walls 6ª to present a relatively shallow receptacle 7ª.

Positioned within the receptacle is a housing or casing 8ª prevented from shifting horizontally with respect to the sleeve by the walls 5ª and 6ª. The housing comprises a bottom or bed plate 9ª of a horizontal extent slightly less than the occupied receptacle to facilitate assembly of the sleeve and housing and having upstanding therefrom a plurality, preferably a pair, of vertically disposed, longitudinally spaced, cup-shaped tubular or cylindrical members 10ª which open upwardly in a direction away from the sleeve. Forming connections between the tubular members are transversely spaced side ribs 11ª of bulged or arcuate configuration, when viewed from the top, which rigidify the housing against stresses to which it will be subjected during service. The side ribs, together with the included portion of the associated cylindrical members, present an upwardly opening chamber or compartment 32, the purpose of which will be hereinafter explained.

As set forth in the previously described embodiment, the height or distance of a vehicle body bolster, only a lower surface thereof being indicated by the diagrammatic line 13ª, from the underlying truck bolster surface 2ª may vary due to manufacturing tolerances, and since the present side bearing is designed to constantly bear against the bolster surfaces, with consideration being given to a predetermined compressive movement of the side bearing, it becomes necessary to provide for a vertical adjustability of the housing and its associated parts. To fulfill this purpose, therefore, a plurality of shims or filler plates 14ª are housed by the receptacle 7ª and interposed between the truck bolster surface 2ª and the housing bottom plate 9ª. The shims may be of any thickness and quantity, as the condition requires, in order to maintain the housing in a predetermined elevated position.

Like the previously described embodiment, no additional means is required to prevent an accidental or unwarranted displacement of the housing from the illustrated position, but as a precautionary measure and to prevent separation of the housing and sleeve during shipment, the portion of each cylinder adjacent the sleeve end wall and the lower extremity of the housing is provided with a transversely extending relief or indent 33. In substantial alignment with each housing indent are apertures 34 in each sleeve end wall, being of a height less than that of the corresponding relief. Extending through the apertures and positioned in the relief is a bar or locking member 35 which is, after application to the side bearing, bent channel-shaped to prevent movement thereof in a longitudinal direction. Each relief extends above and below the associated bar so that the housing may be raised or lowered from the illustrated position as required.

Forming the top or body bolster contacting member of the side bearing is a movable cap or cover 18ª which is formed, in part, by an upper or bearing plate 19ª arranged to present an appreciable area for engagement with the surface 13ª of the body bolster. The bearing plate is positioned a desired distance above the housing, which distance is determinative of the downward movement of the cap or compressive movement of the side bearing. The cap bearing plate has, adjacent its periphery, a depending flange 29ª overlapping the upper extremity of the housing to form a shield whereby foreign substance is prevented from entering the housing. The flange is spaced a predetermined distance away from the housing so that it will not engage the housing during a downward movement of the cap to build up additional forces in the side bearing.

Positioned within each cylinder is a resilient member 20ª formed, in the instant case, of a deformable material such as a rubber compound and being adapted to resiliently resist a compressive movement of the side bearing. So as not to arrest the flow of material upon the application of compressive forces thereto, each resilient member is superimposed upon an upwardly directed convolution 21ª formed in the housing bottom plate and disposed centrally of the associated cylinder, thereby presenting lower pockets for the reception of the displaced material. Likewise, the cap bearing plate is provided with downwardly facing, circular abutments or shoulders 22ª disposed oppositely from the convolutions and bearing upon the upper extremities of the resilient members 20ª.

The resilient members are desirably annular, cylindrical or tubular in formation to contain axial bores 23ª for the accommodation of prongs, arms or depending members 24ª which form continuations of the cap shoulders. Since the prongs are in intimate contact with the resilient members, the arrangement forms a means whereby the cap may be centralized and also a movement of the cap horizontally either in a transverse or a longitudinal direction will be resiliently resisted. The resilient members, before assembly with the housing and cap, are preferably of an outside diameter less than the inside diameter of the occupied cylindrical members 10ª, and the bores 23ª are of a diameter greater than the diameter of the associated prongs so that the housing, cap and resilient members may be easily assembled. Upon depressing the cap to the illustrated position, the resilient members will be initially energized to provide a side bearing of desired capacity. The side bearing is illustrated with the component elements thereof in normal position with the cap capable of moving upwardly away from the housing as the bolster surfaces move away from one another or downwardly toward the housing during a compressive movement of the side bearing.

Assisting the resilient members in resisting the compressive movement of the side bearing and returning a depressed cap to its elevated or illustrated position are a plurality of resilient means of a characteristic different from the rubber members, and by this arrangement a harmonic spring action in the side bearing is avoided.

Illustrative of the resilient means which may be employed are a plurality of helical or coil springs 25a positioned within the chamber 32 and reacting vertically against the housing bottom plate and cap bearing plate. No means is ordinarily required to retain the coil springs in an operable position, but since a shifting of the springs from their illustrated position may result in their engaging the adjacent portion of the housing, to create a false side bearing capacity during a flexure of the springs, centering nibs 36 are formed integrally with the cap and housing and extend inwardly of the springs.

Various means and arrangements may be employed to retain the housing and cap in an assembled relation, illustrative of which are the vertically disposed bolts 37. Each bolt is positioned in connecting, oppositely facing or directed frusto-conical openings 38 and 39 formed axially of each prong, the former of which accommodates a countersunk head 40 of the associated bolt and the latter of which receives a stem 41 of the bolt and permits an unrestricted horizontal movement of the cap with respect to the housing without interference between the bolt stem and prong. Each bolt stem projects through an upwardly facing frusto-conical opening 42 in the housing bottom plate; the opening being so formed to allow a horizontal displacement or pivotal movement of the bolt. The bolt stems have, removably secured to their free extremities, nuts 43 disposed in counter-bores or reliefs 44. To facilitate application of the bolts the cap wear plate is apertured, as at 45, in alignment with the prong apertures, and to arrest the entrance of foreign substance to the interior of the side bearing, each cap aperture is provided with or occupied by a removable plug or disk 46.

From the illustrated embodiments of the invention and the above descriptions thereof it will be apparent that various changes and alterations may be made therein without departing from within the spirit and scope of the appended claims.

We claim:

1. A side bearing, in combination, a housing comprising a plurality of tubular members; a cap having a bearing plate spaced above said housing, deformable resilient material positioned in each of said tubular members, prongs depending from said bearing plate and positioned within said deformable material, the greater portion of said prongs being in intimate contact with said deformable material and spring means of different character interposed between said housing and cap.

2. In a side bearing, in combination, a housing comprising a plurality of tubular members; a cap having a bearing plate normally spaced above said housing; prongs centrally disposed within said tubular members and depending from said bearing plate, and initially compressed deformable resilient means interposed between and in intimate contact with said prongs and tubular members for resisting downward movement of said cap with respect to said housing.

3. In a side bearing, in combination, a housing comprising a plurality of tubular members, annular rubber means positioned within each tubular member, a cap having a bearing plate normally positioned above said housing, a plurality of prongs formed integrally with and depending from said bearing plate, said prongs extending into and engaging said annular rubber means for resisting movement of said cap relatively to said housing, shelves outstanding from said housing, and spring means acting between said shelves and cap.

4. In a side bearing, in combination, a sleeve adapted to be secured to a bolster, a housing positioned within and adjustable vertically relative to said sleeve, rubber means positioned within said housing, a cap having a bearing plate normally spaced above said housing, and having means depending therefrom and engaging said rubber means for resisting a downward and horizontal movement of said cap with respect to said housing, and means extending through said cap and housing for maintaining them in assembled relation.

5. In a side bearing, in combination, a sleeve adapted to be secured to a truck bolster, a housing positioned within and adjustable vertically relative to said sleeve, tie means connecting said sleeve and housing, initially compressed cylindrical resilient means positioned within said housing, a cap having a bearing plate normally spaced above said housing and having means depending therefrom and extending into said resilient means for resisting a downward and horizontal movement of said cap with respect to said housing, a plurality of coil springs reacting against said cap and housing, and means extending through said cap and housing for maintaining them in assembled relation.

6. In a side bearing, in combination, an upwardly opening housing having means upstanding therein, a cap having a bearing plate normally spaced above said housing and an integrally formed depending member positioned within said housing, a shoulder formed on said depending member, and initially compressed resilient means interposed between said shoulder and first named means and extending around said depending member to be in intimate contact therewith, said resilient means being adapted to resist a horizontal movement of said cap relative to said housing.

7. In a side bearing, in combination, an upwardly opening housing having a means upstanding therein, a cap having a bearing plate normally spaced above said housing, a shoulder formed on said cap and extending into said housing, compressed deformable resilient means interposed between and engaging said shoulder and upstanding means for resisting a downward movement of said cap with respect to said housing, and spring means acting between said housing and cap.

8. In a side bearing, in combination, an upwardly opening housing having a plurality of convolutions therein, a cap having a bearing plate normally spaced above said housing, shoulders formed on said cap and extending into said housing, compressed deformable resilient means interposed between and engaging said shoulders and convolutions for resisting a downward movement of said cap with respect to said housing, spring means positioned within said housing and between said resilient means, and means extending through said cap and housing for preventing separation thereof.

9. In a side bearing, in combination, a housing having a plurality of tubular members, a centrally disposed tapered aperture in each tubular member, a cap having a bearing plate normally positioned above said housing, a plurality of prongs depending from said bearing plate and extending into said tubular members, a compressed annular resilient member positioned within each tubular member and engaging an associated prong for resisting movement of said cap relatively to said housing, said prongs each having a tapered surface extending therethrough, and means extending through all of said tapered apertures for maintaining said cap and housing in assembled relation.

10. In a side bearing, in combination, a housing having a plurality of tubular members, centrally disposed frusto-conical apertures in each of said tubular members, a cap having a bearing plate normally spaced above said housing, a plurality of prongs depending from said bearing plate and extending into said tubular members, a compressed annular resilient member positioned within each tubular member and engaging an associated prong for resisting a downward and horizontal movement of said cap relative to said housing, said prongs each having a frusto-conical aperture extending therethrough, means extending through all of said frusto-conical apertures for maintaining said cap and housing in assembled relation, and a coil spring reacting against said cap and housing.

11. In a side bearing, in combination, a sleeve, a housing positioned within and adjustable vertically relatively to said sleeve, a compressed resilient deformable member positioned within said housing having a centrally disposed bore, a cap having a bearing plate normally spaced above said housing and an integrally formed depending member positioned within said bore, said deformable member being adapted to resist a downward and horizontal movement of said cap relative to said housing, shelves outstanding from said housing, extensions formed on said bearing plate, and spring means interposed between said shelves and extensions.

12. In a side bearing, in combination, a housing comprising an upstanding member, an inverted dish portion in said housing, a cap having a bearing plate normally spaced above said housing, a shoulder on said bearing plate extending toward said dish portion, and deformable resilient means positioned within said member and bearing upon said shoulder and dish portion, said deformable resilient means being initially compressed and adapted to resiliently resist a movement of said cap toward said housing.

13. A housing for use with a side bearing comprising a lower plate, a plurality of tubular members upstanding from said lower plate, and inverted dish portions formed on said lower plate extending into said tubular members to form supports for resilient elements.

14. In a side bearing housing, in combination, a lower plate, a member upstanding from said lower plate and adapted to receive a resilient means, and a shelf outstanding from said member in vertically spaced relation to said lower plate and adapted to form a spring seat.

15. In a side bearing, the combination of, a sleeve having a base plate, laterally spaced side walls upstanding from said base plate, longitudinally spaced end walls upstanding from said base plate and connecting said side walls; all of said walls defining an aperture extending entirely through said sleeve for the reception of adjusting means, and a housing positioned within said aperture and having means outstanding therefrom; said end walls being of lesser height than said side walls and underlying said outstanding means.

DONALD S. BARROWS.
EMIL H. BLATTNER.